United States Patent
Bryant et al.

(10) Patent No.: US 8,593,971 B1
(45) Date of Patent: Nov. 26, 2013

(54) ATM NETWORK RESPONSE DIAGNOSTIC SNAPSHOT

(75) Inventors: Matthew K. Bryant, Gastonia, NC (US); Nicholas J. Munson, Charlotte, NC (US); Daniel J. Farinella, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 400 days.

(21) Appl. No.: 13/012,876

(22) Filed: Jan. 25, 2011

(51) Int. Cl.
*H04L 12/26* (2006.01)

(52) U.S. Cl.
USPC .......................................... 370/241; 370/252

(58) Field of Classification Search
None
See application file for complete search history.

(56) References Cited

U.S. PATENT DOCUMENTS

| | | |
|---|---|---|
| 4,650,977 A | 3/1987 | Couch |
| 5,214,652 A | 5/1993 | Sutton |
| 5,386,104 A | 1/1995 | Sime |
| 5,550,816 A | 8/1996 | Hardwick et al. |
| 5,619,644 A | 4/1997 | Crockett et al. |
| 5,805,798 A | 9/1998 | Kearns et al. |
| 5,917,168 A | 6/1999 | Nakamura et al. |
| 5,964,831 A | 10/1999 | Kearns et al. |
| 5,984,178 A | 11/1999 | Gill et al. |
| 5,999,908 A | 12/1999 | Abelow |
| 6,263,497 B1 | 7/2001 | Maeda et al. |
| 6,405,329 B1 | 6/2002 | Colligan et al. |
| 6,408,334 B1 | 6/2002 | Bassman et al. |
| 6,415,189 B1 | 7/2002 | Hajji |
| 6,437,692 B1 | 8/2002 | Petite et al. |
| 6,539,570 B2 | 4/2003 | Youn et al. |
| 6,574,686 B1 | 6/2003 | Sha et al. |
| 6,654,709 B2 | 11/2003 | Aoshika et al. |
| 6,687,714 B1 | 2/2004 | Kogen et al. |
| 6,711,612 B1 | 3/2004 | Blumenau et al. |
| 6,813,634 B1 | 11/2004 | Ahmed |
| 6,834,305 B1 | 12/2004 | Haynes et al. |
| 6,847,994 B1 | 1/2005 | Akimoto et al. |
| 6,880,003 B2 | 4/2005 | Greenwood |
| 6,896,179 B2 | 5/2005 | Satoh et al. |
| 6,917,594 B2 | 7/2005 | Feuerstraeter et al. |

(Continued)

FOREIGN PATENT DOCUMENTS

| | | |
|---|---|---|
| EP | 0961246 | 1/1999 |
| EP | 2088564 | 12/2009 |
| WO | WO 0135190 | 5/2001 |
| WO | WO 2004044800 | 5/2004 |

OTHER PUBLICATIONS

Shankoo, "Self-Serviced Car Wash" (ADAM Forum—Powered by Discuz! Board), May 18, 2008, ADAM Forum.

(Continued)

*Primary Examiner* — Min Jung
(74) *Attorney, Agent, or Firm* — Weiss & Arons LLP; Michael Springs (57) ABSTRACT

Methods and apparatus according to the invention are directed towards providing apparatus for targeting network problems. Such apparatus may include a database configured to store a workload. The apparatus may also include a transmitter configured to transmit the workload to a CPU included in an ATM via a telecommunications network. The workload may include instructions to (1) execute a script, (2) record an output generated from the execution of the script, and (3) transmit the recorded output via the telecommunications network to a receiver. The apparatus may further include the receiver being configured to receive the transmitted recorded output via the telecommunications network.

14 Claims, 7 Drawing Sheets

(56) References Cited

U.S. PATENT DOCUMENTS

| | | | |
|---|---|---|---|
| 6,953,150 B2 | 10/2005 | Shepley et al. | |
| 6,976,622 B1 | 12/2005 | Trelawney et al. | |
| 7,053,767 B2 | 5/2006 | Petite et al. | |
| 7,151,780 B1 | 12/2006 | Belscher et al. | |
| 7,163,144 B1 | 1/2007 | Trelawney et al. | |
| 7,177,839 B1 | 2/2007 | Claxton et al. | |
| 7,232,063 B2 | 6/2007 | Fandel et al. | |
| 7,293,201 B2 | 11/2007 | Ansari | |
| 7,295,993 B1 | 11/2007 | Meek et al. | |
| 7,328,376 B2 | 2/2008 | McGuire et al. | |
| 7,334,723 B2 | 2/2008 | Shepley et al. | |
| 7,380,125 B2 | 5/2008 | Di Luoffo et al. | |
| 7,401,264 B1 | 7/2008 | Gill et al. | |
| 7,406,035 B2 | 7/2008 | Harvey et al. | |
| 7,406,630 B1 | 7/2008 | Gill et al. | |
| 7,417,991 B1 * | 8/2008 | Crawford et al. | 370/394 |
| 7,484,134 B2 | 1/2009 | Wolf et al. | |
| 7,490,263 B2 | 2/2009 | King | |
| 7,522,916 B2 | 4/2009 | Grossi et al. | |
| 7,526,684 B2 | 4/2009 | Bicknell et al. | |
| 7,599,859 B2 | 10/2009 | Fulton et al. | |
| 7,600,671 B2 | 10/2009 | Forrest et al. | |
| 7,606,767 B1 | 10/2009 | Couper et al. | |
| 7,620,948 B1 | 11/2009 | Rowe et al. | |
| 7,641,107 B1 | 1/2010 | Gill et al. | |
| 7,647,325 B2 | 1/2010 | Papatla et al. | |
| 7,664,697 B2 | 2/2010 | Takayama | |
| 7,677,447 B2 | 3/2010 | MacPhail et al. | |
| 7,681,089 B2 | 3/2010 | Ashmore | |
| 7,702,773 B2 | 4/2010 | Lopez | |
| 7,717,327 B2 | 5/2010 | Gomes | |
| 7,738,123 B2 | 6/2010 | Burgoyne et al. | |
| 7,757,940 B2 | 7/2010 | Sawa | |
| 7,774,649 B2 | 8/2010 | Neilan | |
| 7,778,937 B2 | 8/2010 | Ferrara et al. | |
| 7,792,045 B1 | 9/2010 | Vijendra | |
| 7,796,528 B2 | 9/2010 | Yoshizawa | |
| 7,860,016 B1 | 12/2010 | Vijendra et al. | |
| 7,861,120 B2 | 12/2010 | Cui | |
| 7,873,726 B2 | 1/2011 | Ofir et al. | |
| 7,908,525 B2 | 3/2011 | Fujishita | |
| 7,921,420 B2 | 4/2011 | Ferlitsch | |
| 7,926,712 B2 | 4/2011 | Schlabach et al. | |
| 7,934,006 B2 | 4/2011 | Kato et al. | |
| 7,937,460 B2 | 5/2011 | Vaught | |
| 7,940,685 B1 * | 5/2011 | Breslau et al. | 370/251 |
| 8,015,455 B1 | 9/2011 | Vannatter et al. | |
| 8,161,330 B1 | 4/2012 | Vannatter et al. | |
| 8,214,290 B1 | 7/2012 | Vannatter et al. | |
| 8,255,698 B2 | 8/2012 | Li et al. | |
| 8,316,263 B1 | 11/2012 | Gough et al. | |
| 8,397,108 B1 | 3/2013 | Vannatter et al. | |
| 8,407,162 B2 | 3/2013 | Devitt et al. | |
| 2001/0037438 A1 | 11/2001 | Mathis | |
| 2002/0006115 A1 * | 1/2002 | Hedayat et al. | 370/252 |
| 2002/0029350 A1 | 3/2002 | Cooper et al. | |
| 2002/0065775 A1 | 5/2002 | Monaghan | |
| 2002/0091972 A1 | 7/2002 | Harris et al. | |
| 2002/0095480 A1 | 7/2002 | Drummond et al. | |
| 2002/0125998 A1 | 9/2002 | Petite et al. | |
| 2003/0040959 A1 | 2/2003 | Fei et al. | |
| 2003/0110248 A1 | 6/2003 | Ritche | |
| 2003/0163388 A1 | 8/2003 | Beane | |
| 2004/0003266 A1 | 1/2004 | Moshir et al. | |
| 2004/0044693 A1 | 3/2004 | Hadley et al. | |
| 2004/0050927 A1 | 3/2004 | Nozaki et al. | |
| 2004/0073843 A1 | 4/2004 | Dean et al. | |
| 2004/0081102 A1 * | 4/2004 | Russell Bennett | 370/252 |
| 2004/0225927 A1 | 11/2004 | Warpenburg et al. | |
| 2004/0249776 A1 | 12/2004 | Horvitz et al. | |
| 2005/0020265 A1 * | 1/2005 | Funabiki et al. | 455/436 |
| 2005/0066019 A1 | 3/2005 | Egan et al. | |
| 2005/0096810 A1 | 5/2005 | Mahoney et al. | |
| 2005/0151987 A1 | 7/2005 | Kawaura et al. | |
| 2006/0048017 A1 | 3/2006 | Anerousis et al. | |
| 2006/0181406 A1 | 8/2006 | Petite et al. | |
| 2006/0227766 A1 * | 10/2006 | Mickle et al. | 370/356 |
| 2006/0242389 A1 | 10/2006 | Browning et al. | |
| 2007/0214215 A1 | 9/2007 | McCaleb et al. | |
| 2008/0040543 A1 | 2/2008 | Yamazaki et al. | |
| 2008/0116254 A1 | 5/2008 | Sleeman | |
| 2008/0121692 A1 | 5/2008 | MacPhail et al. | |
| 2008/0159162 A1 * | 7/2008 | Morikuni et al. | 370/252 |
| 2008/0168116 A1 * | 7/2008 | Oda et al. | 708/290 |
| 2009/0037284 A1 | 2/2009 | Lewis et al. | |
| 2009/0057395 A1 | 3/2009 | He et al. | |
| 2009/0058535 A1 | 3/2009 | Wilson | |
| 2009/0081989 A1 | 3/2009 | Wuhrer | |
| 2009/0161580 A1 | 6/2009 | Forsyth | |
| 2009/0199044 A1 | 8/2009 | Hurrell | |
| 2009/0199050 A1 | 8/2009 | Neilan | |
| 2009/0199053 A1 | 8/2009 | Neilan et al. | |
| 2009/0204856 A1 | 8/2009 | Sinclair et al. | |
| 2009/0204858 A1 | 8/2009 | Kawaba | |
| 2010/0042744 A1 | 2/2010 | Rahman et al. | |
| 2010/0082933 A1 | 4/2010 | Fleming et al. | |
| 2010/0115583 A1 | 5/2010 | Delia et al. | |
| 2010/0161343 A1 | 6/2010 | Kennedy et al. | |
| 2010/0162030 A1 | 6/2010 | Schindel, Jr. et al. | |
| 2010/0162050 A1 | 6/2010 | Cathro | |

OTHER PUBLICATIONS

Shankoo, "Self-Serviced Car Wash" (Self-Serviced Car Wash—Machine Automation—Vertical Market Applications—ADAM), May 18, 2008, ADAM Forum.

"NCR's Gasper Exchange enhances ATM management", Networld Alliance, Dec. 18, 2006, Louisville, Kentucky.

European search Report for Application GB1007102.5, Aug. 12, 2010.

"NCR APTRA Advance NDC," NCR Corporation, retrieved on Feb. 1, 2010, Darien, Connecticut.

"NCR Aptra Exchange," NCR Corporation, retrieved on Feb. 1, 2010, Darien, Connecticut.

"A solution for processing transactions from any endpoint and upgrading legacy systems to support new delivery channels," ACI Worldwide, Retrieved on Feb. 1, 2010, Elkhorn, Nebraska.

Lai, Richard, "ING Direct's iOS app adds 'bump' money transfer feature for well-heeled posses," Engadget, May 2, 2011.

"Patch (computing)" (http://en.wikipedia.org/w/index.php?title=Patch_(computing)&oldid=284067392), Wikipedia.org, Wikimedia Foundation, Inc. (registrant), Apr. 15, 2009, San Francisco, California.

* cited by examiner

ATM NETWORK RESPONSE DIAGNOSTIC SNAPSHOT

FIELD OF TECHNOLOGY

This invention relates to targeting network problems. More specifically, this invention relates to targeting network problems in automated teller machine (ATM) networks.

BACKGROUND OF THE INVENTION

A network diagnosis technician typically assesses a remote computer's connection to a server by sending an Internet Control Message Protocol (ICMP) echo request packet from the technician's computer to the server (also known as 'pinging').

Such network diagnosis techniques are not configured to assess the remote computer's connection to the server. This is at least because pinging from a technician's computer to a server tests the technician's connection to the server and not the remote computer's connection to the server.

Therefore, it is desirable to provide systems and methods for a network diagnosis technique that is configured to assess network problems that include a remote computer's connection to a server.

Furthermore, pinging a server is typically configured to measure (1) an amount of time elapsed between the transmission of the ICMP echo request packet to the server and the reception of a reply ICMP echo request packet from the server and (2) any packet loss.

Therefore, it is further desirable to provide systems and methods that enable a technician to transmit a workload configured to measure network characteristics that extend beyond latency and packet loss.

SUMMARY OF THE INVENTION

Methods and apparatus according to the invention are directed towards providing apparatus for targeting network problems. Such apparatus may include a database configured to store a workload. The apparatus may also include a transmitter configured to transmit the workload to a central processing unit (CPU) included in an automated teller machine (ATM) via a telecommunications network. The workload may include instructions to (1) execute a script, (2) record an output generated from the execution of the script, and (3) transmit the recorded output via the telecommunications network to a receiver. The apparatus may further include the receiver being configured to receive the transmitted recorded output via the telecommunications network. The execution of the script by the ATM CPU may include transmitting an echo request packet to the external device. The recorded output may include (1) a measurement of the time elapsed between the transmission of the echo request packet to the external device and the reception of a reply request packet from the external device and (2) any packet loss.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Systems, methods and apparatus according to the invention provide enhanced network diagnostic techniques. Enhanced network diagnostic techniques according to the invention may include using a receiver included in an automated teller machine (ATM) central processing unit (CPU) to receive a workload sent via a telecommunications network. The workload sent via the telecommunications network may include instructions for the ATM CPU to execute a script included in the workload. The script, when executed by a processor included in the ATM CPU, may be configured to assess one or more characteristics of a network connection between the ATM CPU and a device external to the ATM CPU (referred to alternately hereinafter as "external device").

In some embodiments of the invention, the script may be configured to assess characteristics of a network connection between the ATM CPU and a hardware device external to the ATM CPU. Exemplary external hardware devices that may be assessed in accordance with the systems and methods of the invention include: a modem, a router, a deposit acceptor, a bill dispenser, a check deposit module, an envelope deposit module, a card reader (to identify the card being used), a keypad and/or a monitor. Additional exemplary external hardware devices include: a cryptoprocessor, a PIN pad, a display, function keys, a touch screen, a printer, a vault, a housing, a smart card reader (that reads a chip instead of a magnetic strip) and/or any other suitable self-service device, object or peripheral.

In additional embodiments of the invention, the script may be configured to assess characteristics of a network connection between the ATM CPU and a software device external to the ATM CPU (i.e., not included in the ATM CPU's database). Exemplary software devices that may be assessed in accordance with the systems and methods of the invention include: one or more suitable web servers, interbank networks, software applications, authorization systems and/or software used to represent an external hardware device. Additional exemplary software devices include: an ATMC (ATM Controller, a system used in financial institutions to route financial transactions between ATMs, core banking systems and other banks), Base24 (a software application available from ACI Worldwide Corp., Omaha, Nebr. under the trademark BASE24) and/or any other suitable electronic application/platform.

Furthermore, any device that represents a logical, virtual, or physical device for which a driver handles I/O (input/output) requests may be assessed in accordance with the systems and methods of the invention.

A network connection assessed during the execution of the script may be established between the ATM CPU and an external device via microcontrollers, application-specific integrated circuits, a universal serial bus (USB) connection, Ethernet and/or via internet protocol (IP) communications.

A network connection assessed during the execution of the script may also be established via ADSL (Asymmetric Digital Subscriber Line), a dial-up modem over a telephone line, directly via a leased line, using a high speed Internet VPN (Virtual Private Network) connection and/or any other suitable method.

It should be noted that an exemplary USB connection utilized to establish a network connection between the ATM CPU and an external device may store data received from the external device in a ULZ file extension. The ULZ file extension may contain data captured by USBlyzer, a USB protocol analysis program.

A script in accordance with the systems and methods of the invention may be included in a workload sent to an ATM CPU via a telecommunications network. The workload may include instructions to execute the script. The script, when executed by a processor included in the ATM CPU, may be configured to assess one or more characteristics of one or more network connections between the ATM CPU and one or more external devices.

The workload may be transmitted to the ATM CPU over any suitable telecommunications network in electronic communication with the ATM CPU. Exemplary networks that may be in electronic communication with the ATM CPU include ADSL, a dial-up modem over a telephone line, a leased line and/or an Internet VPN connection.

In some embodiments, a technician may initiate the transmission of the workload to the ATM CPU over the telecommunications network. Alternately, a remote transmitter may initiate the transmission of the workload to the ATM CPU. In these embodiments, the remote transmitter may transmit the workload during predetermined time periods, user-selected time-periods and/or upon receipt of a request to transmit the workload.

An external event may trigger the transmission of the workload to the ATM CPU. For example, receipt of information corresponding to the malfunction of an external device may trigger the transmission of the workload. In these embodiments, the transmitted workload may relate, at least in part, to assessing characteristics of the network connection between the ATM CPU and the malfunctioning external device.

In other embodiments, the workload may be stored in the ATM CPU and transmitted to a processor included in the ATM CPU during predetermined time periods, user-selected time-periods and/or upon receipt of a command to transmit the workload. The workload may also be transmitted to the processor upon receipt of information corresponding to the malfunction of an external device. In these embodiments, the transmitted workload may relate, at least in part, to assessing characteristics of the network connection between the ATM CPU and the malfunctioning external device.

It should be noted that any combination of the aforementioned systems and methods relating to the transmission of the workload to the ATM CPU may be used in one or more embodiments of the invention.

The workload in accordance with the systems and methods of the invention may include an instruction to execute a script. The script, when executed by a processor included in the ATM CPU, may assess one or more characteristics of a network connection between the ATM CPU and an external device.

Exemplary characteristics of a network connection that may be assessed during the execution of the script include the accessibility of the external device, whether the ATM CPU can connect to the external device, communicate with it and/or if the ATM CPU and the external deice can acknowledge one another.

Additional exemplary characteristics of a network connection that may be assessed during the execution of the script include the network speed of the network connection and/or the operational health of the network connection.

Prior to, during or following the ATM CPU's execution of the script, the script may instruct the ATM CPU to record data generated during the execution of the script. The ATM CPU may store this data in a database. The script may also instruct the ATM CPU to transmit at least some of the stored data to one or more network addresses via one or more telecommunication networks.

The one or more network addresses to which the ATM CPU may transmit the recorded data may be predetermined and/or user-selected. In some embodiments, the network address to which the ATM CPU may transmit the recorded data may be the same network address that transmitted the workload to the ATM CPU via the telecommunications network. In other embodiments, the network address to which the ATM CPU may transmit the recorded data may be a network address different from the network address that transmitted the workload.

For example, in some embodiments of the invention the script may include an instruction for the ATM CPU to send an ICMP echo request packet to an external device. In these embodiments, the workload may include an instruction for the ATM CPU to wait for an ICMP response. The workload may also include an instruction for the ATM CPU to record maximum, minimum, and mean round-trip times, the standard deviation of the mean and/or any packet loss. The workload may further include instructions for the ATM CPU to transmit at least some of the recorded data to one or more network addresses via the telecommunications network.

It should be noted that in some embodiments, the workload may be able to configure the packet size of the ICMP echo request packet. In these embodiments, the script in the workload may be modified to utilize the configured packet size. The ICMP echo request packet with the configured packet size may be used to test the connection between the ATM CPU and an external device. The ICMP echo request packet with the configured packet size may also be used to create additional network overhead. Such additional network overhead may be used to artificially stress the communication path. Thus, these embodiments may be used to simulate actual application network traffic and test the effect of the simulated network traffic on the communication path.

In additional embodiments of the invention, the workload may include instructions to establish a session with the external device. These systems and methods may use the session to continue the testing of Network Response out from the ATM to other external devices such as, for example, remote servers. Thus, these systems and methods may be configured to establish an application layer session with an external device. These embodiments, therefore, may assist determining the connectivity to an external device and/or determining if the external device is active and listening for connectivity from the ATM CPU. A remote technician may be able to use these systems and methods to diagnose the difference between a general network outage and an application outage. It should be noted that these instructions to establish a session with the external device may be transmitted to the ATM CPU in the form of a separate script.

Furthermore, in other embodiments of the invention, the script may be configured to assess one or more characteristics included in an application layer of an external device. In these embodiments, the execution of the script may identify the presence of a logon prompt hosted by the application layer of an external device. Additionally, the execution of the script may determine if the scripts could be used to gather and parse data that verifies the functioning of application level communication. These embodiments may be used in the event that the external device is supposed to provide configuration information to the ATM and/or in any other suitable embodiments.

The systems and methods of the invention may also be used to determine if the ATM CPU is in a working state, degraded state or critical state. For example, an ATM CPU may have ten external devices that it relies upon for proper functionality. In the event that the systems and methods of the invention determine that the connectivity between the ATM CPU and each of the ten external devices is functioning properly, the ATM CPU may be determined to be in a working state. In the event that the connection between the ATM CPU and one or more of the external devices is determined to be in a degraded state, the ATM CPU may be determined to be in a degraded state. Furthermore, in the event that the number of external devices in a degraded state is greater than or equal to a threshold number, the ATM CPU may be determined to be in a critical state.

In additional embodiments of the invention, the external devices in communication with the ATM CPU may be weighed for their importance to the functional health of the ATM CPU. For example, an ATM CPU may have ten external devices that it relies upon for proper functionality. Of these ten external devices, five may be classified as critical devices and five may be classified as non critical devices. Thus, in these embodiments, the determination of whether the ATM CPU is in a working state, degraded state and/or critical state will depend on the number of external devices in a degraded state and/or the classification of the external devices in the degraded state.

In an exemplary embodiment, the network diagnostic techniques of the invention may determine that three of the non critical external devices of the ATM CPU are in a degraded state because they are not currently reachable and are unable to execute sessions. In this exemplary embodiment, the ATM CPU may be determined to be in a degraded state.

In an additional exemplary embodiment, the network diagnostic techniques of the invention may determine that the ATM CPU is unable to communicate with an external device that has been classified as a critical external device. In this exemplary embodiment, the ATM CPU may subsequently be determined to be in a critical state. It should be noted that the determination that the ATM CPU is in a critical state may trigger one or more warning alerts to off-site technician(s), stating that the ATM CPU is experiencing a critical outage and is in need of immediate attention.

Thus, network characteristics assessed by the systems and methods of the invention may assist a technician and/or a computer program to determine the sufficiency of a network connection between an ATM CPU and an external device. The characteristics assessed by the systems and methods of the invention may also assist a technician and/or a computer program to determine whether upgrades are needed for the external device and/or the ATM CPU. In the event that the ATM CPU determines that upgrades are needed for the external device and/or the CPU, and ATM CPU may be further configured to implement the necessary upgrades.

It should be noted that the network connection assessed by the systems and methods of the invention may include any electronic connection established between the ATM CPU and an external device.

It should also be noted that the systems and methods of the invention are not limited to assessing a network connection between an ATM CPU and a device external to the ATM CPU. Rather, the systems and methods of the invention may be implemented in any suitable hardware or software to enable assessment of a network connection between the hardware/software and a device external to the hardware/software. For example, the systems and methods of the invention may be implemented in a self-service device, a personal computer, a mobile phone and/or an operating system.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
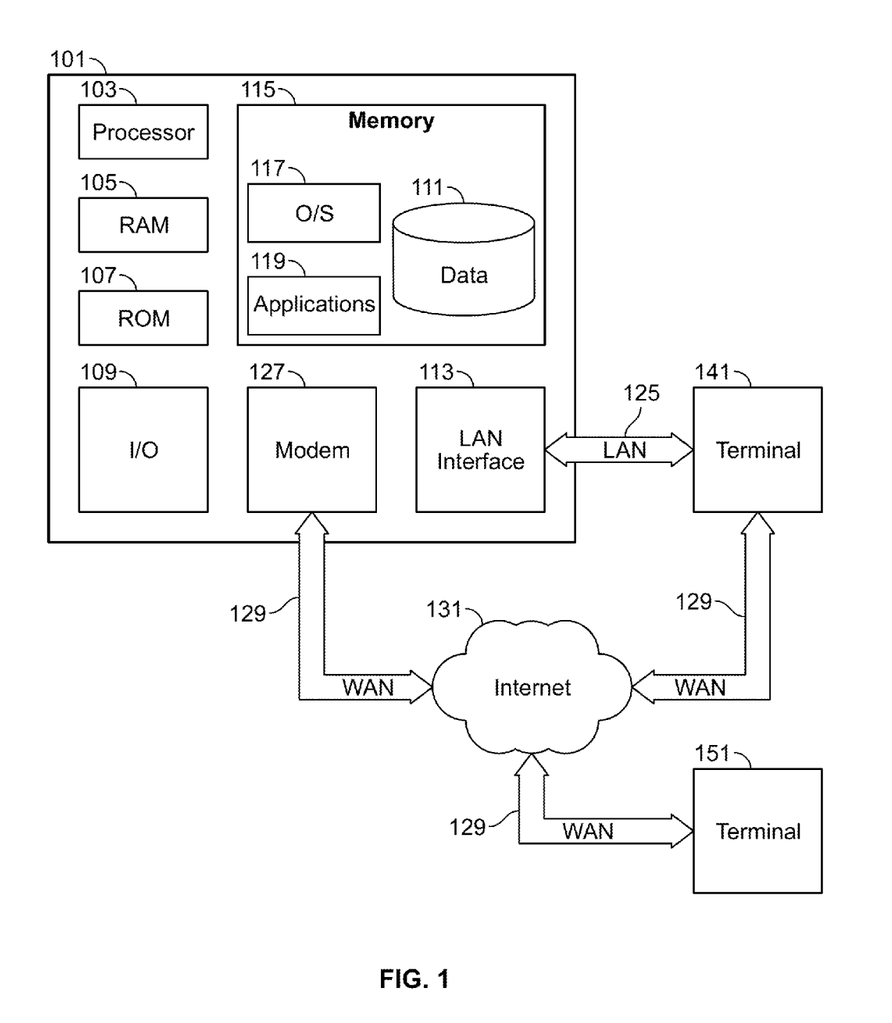
FIG. 1 shows apparatus that may be used in accordance with the principles of the invention.

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 111, and any other suitable information, may be stored in memory 115.

One or more of applications 119 may include one or more algorithms that may be used to execute the script included in the workload in accordance with the systems and methods of the invention.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
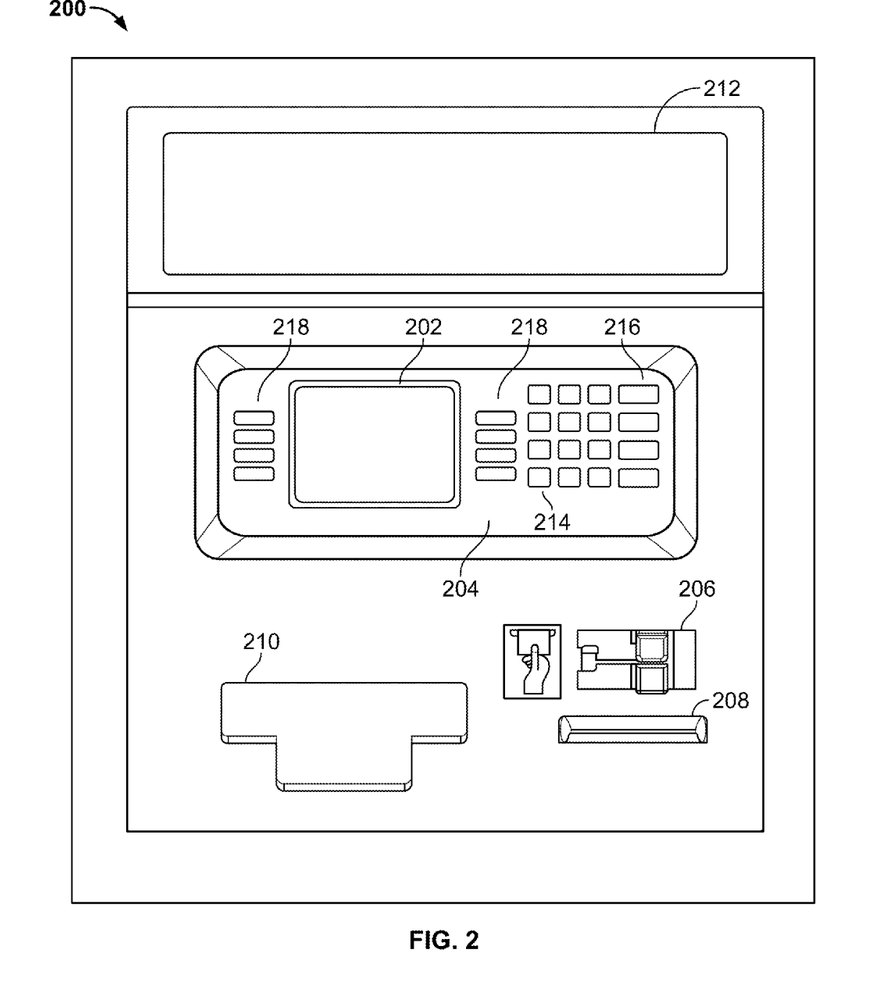
FIG. 2 shows a schematic diagram of hardware apparatus for use according to the principles of the invention.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter numerical and textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards. In some embodiments, self-service device 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

Item dispenser 210 may dispense items. For example, item dispenser 210 may dispense bills.

Security screen 212 may visually screen a surveillance device (not shown). The surveillance device may provide video information about individuals that are present near the self-service device and the conditions there.

Figure 3:
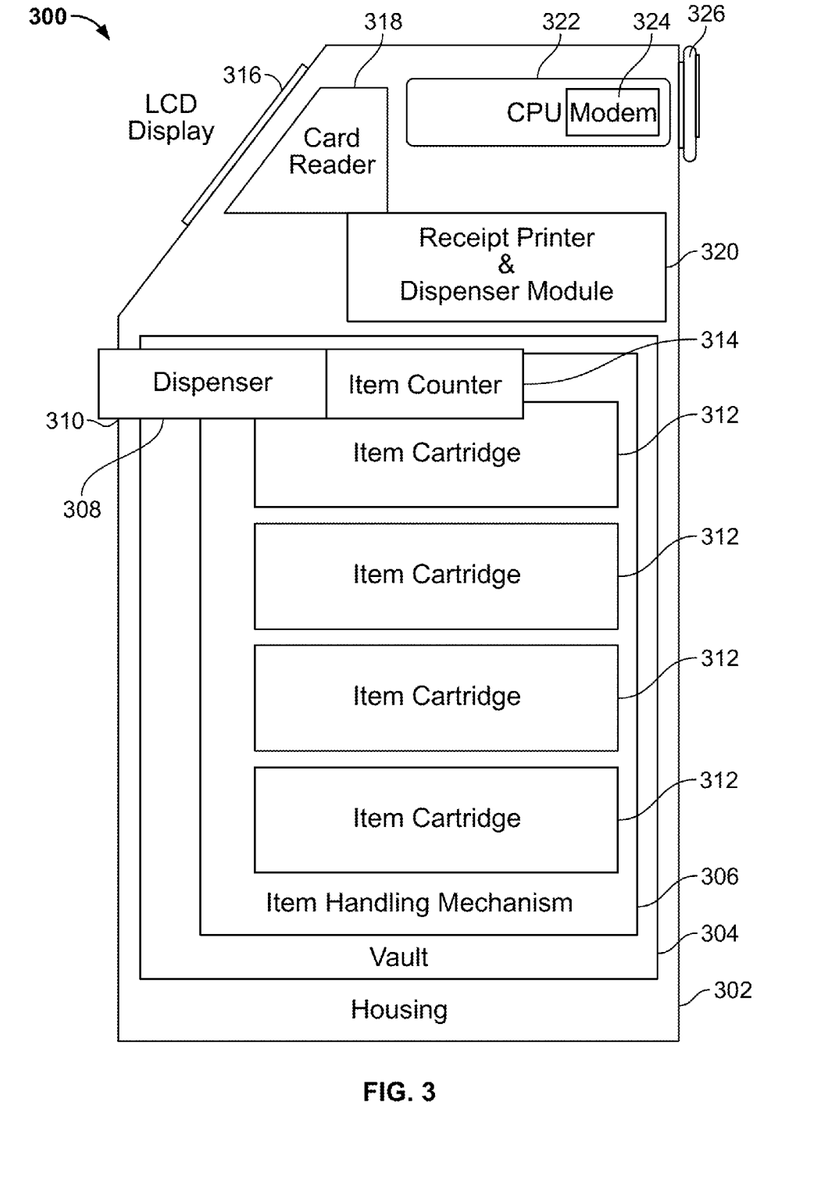
FIG. 3 shows another schematic diagram of hardware apparatus for use according to the principles of the invention.

FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 320 may control customer I/O, dispensing processes, which may include initialization, actuation, dispensing and any other suitable processes, receipt printing and dispensing, transaction channel communications and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
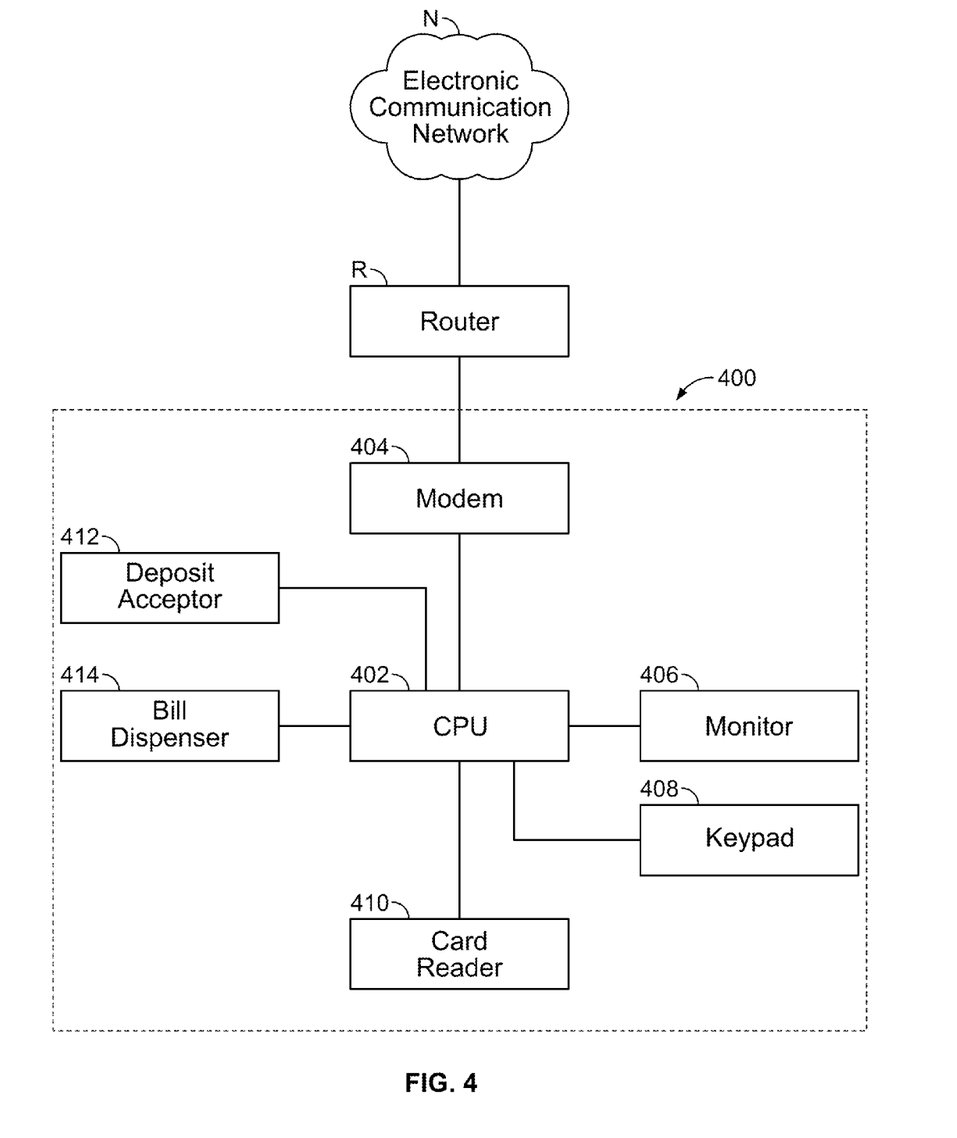
FIG. 4 shows additional apparatus that may be used in accordance with the principles of the invention.

FIG. 4 shows control system 400 for controlling a self-service device such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

Figure 5A:
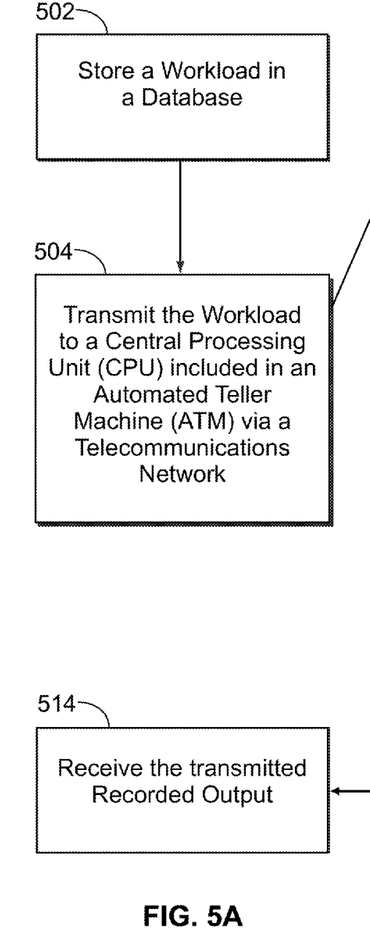
FIGS. 5A and 5B shows a process that may be used in accordance with the systems and methods of the invention.
Figure 5B:
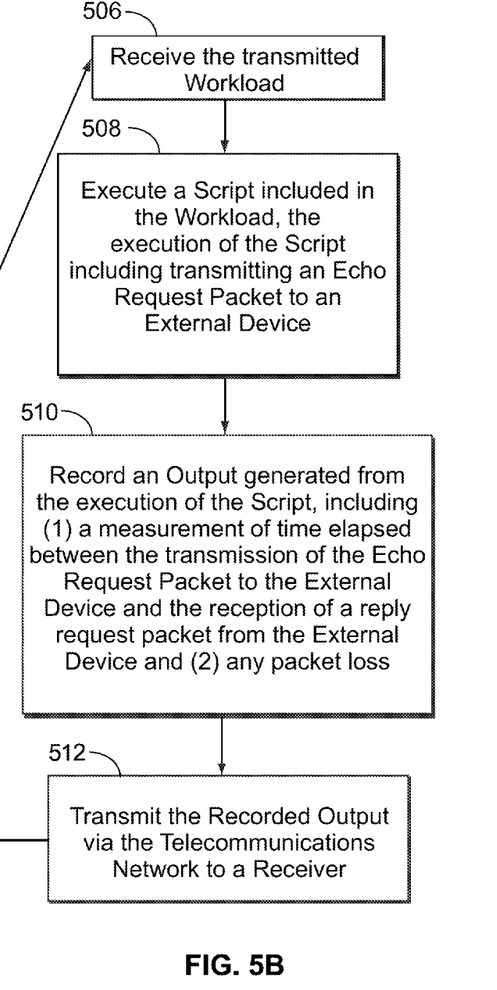

FIGS. 5A and 5B show a process that may be used in accordance with the systems and methods of the invention. Steps 502, 504 and 514, which are included in FIG. 5A, may be executed by any computer, processor, mainframe and/or workstation separate from an ATM CPU (referred to hereinafter as a "remote computer"). Steps 506-512, which are included in FIG. 5B, may be executed by an ATM CPU.

Process 5A may begin at 502. At step 502, a remote computer may store a workload in a database. At step 504, the remote computer may transmit the workload to an ATM CPU via a telecommunications network.

Process 5B may begin at step 506. At step 506, the ATM CPU may receive the transmitted workload from the remote computer via the telecommunications network. At step 508, the ATM CPU may execute a script included in the workload. The execution of the script may include transmitting an echo request packet to an external device. At step 510, the ATM CPU may record an output generated from the execution of the script. The recorded output may include (1) a measurement of time elapsed between the transmission of the echo request packet to the external device and the reception of a reply request packet from the external device and (2) any packet loss. Process 5B may conclude at step 512. At step 512, the ATM CPU may transmit the recorded output via the telecommunications network to a receiver included in the remote computer.

Process 5A may conclude at step 514. At step 514, the remote computer may receive the transmitted recorded output.

Figure 6:
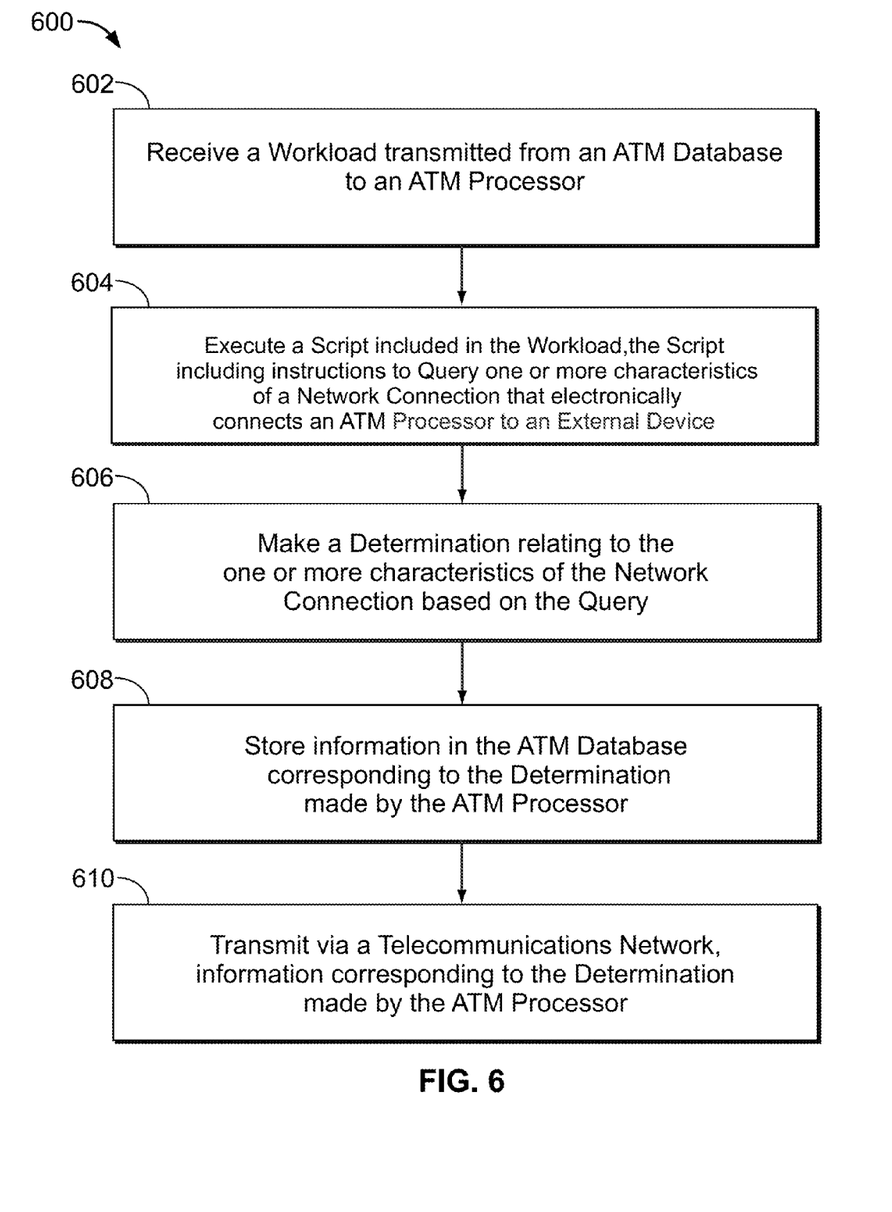
FIG. 6 shows an additional process that may be used in accordance with the systems and methods of the invention.

FIG. 6 shows an additional process 600 that may be used in accordance with the systems and methods of the invention. Process 600 may begin at step 602. At step 602, an ATM CPU may receive a workload transmitted from an ATM database to an ATM processor. At step 604, the ATM CPU may execute a script included in the workload. The script may include instructions to query one or more characteristics of a network connection that electronically connects an ATM processor to an eternal device. At step 606, the ATM CPU may make a determination relating to the one or more characteristics of the network connection based on the query. At step 608, the ATM CPU may store information in the ATM database corresponding to the determination made by the ATM processor. Process 600 may optionally include step 610. At step 610, the ATM CPU may transmit, via a telecommunications network, information corresponding to the determination made by the ATM processor. It should be noted that the ATM CPU may transmit this information to an ATM technician, a remote database, or any other suitable network address.

Figure 7:
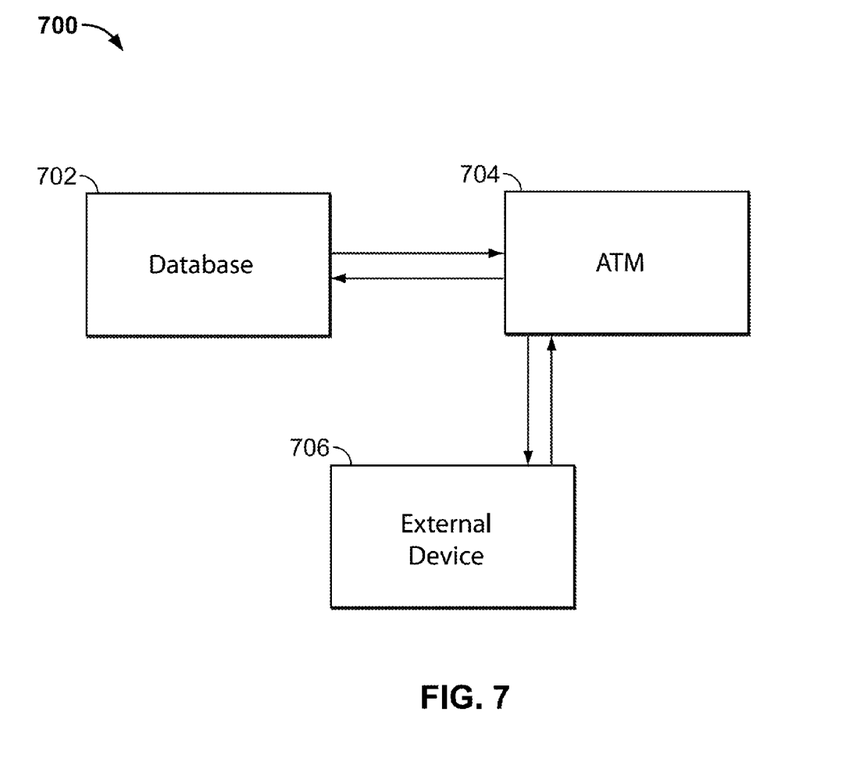
FIG. 7 shows hardware that may be used in accordance with the systems and methods of the invention.

FIG. 7 shows hardware that may be used in accordance with the systems and methods of the invention. FIG. 7 includes database 702, ATM 704, and external device 706. Database 702 may be in two-way communication with ATM 704. ATM 704 may be in two-way communication with external device 706.

Thus, methods and apparatus for targeting network problems according to the systems and methods of the invention have been provided. Persons skilled in the art will appreciate that the present invention can be practiced by other than the described embodiments, which are presented for purposes of illustration rather than of limitation, and that the present invention is limited only by the claims that follow.

What is claimed is:

1. An Automated Teller Machine (ATM) configured to target ATM operational problems, the ATM comprising:
    an ATM receiver configured to receive a workload transmitted via a telecommunications network; and
    an ATM central processing unit (CPU) configured to execute the workload, the workload including instructions to (1) execute a script, (2) record an output generated from the execution of the script, and (3) transmit the recorded output via the telecommunications network to a receiver;
wherein:
    the execution of the script by the ATM CPU includes transmitting an echo request packet to a device external to the ATM CPU and internal to the ATM; and
    the recorded output includes (1) a measurement of time elapsed between the transmission of the echo request packet to the external device and the reception of a reply request packet from the external device, and (2) any packet loss.

2. The ATM of claim 1, wherein the telecommunications network is a cable network.

3. The ATM of claim 1, wherein the telecommunications network is an internet connection.

4. The ATM of claim 1, wherein the recorded output further includes a minimum round-trip time, a maximum round-trip time and a mean round-trip time.

5. The ATM of claim 4, wherein the recorded output further includes a standard deviation of the mean.

6. The ATM of claim 1, wherein the recorded output further includes a determination of the connection of the ATM CPU to the external device.

7. The ATM of claim 1, wherein the external device is an ATM deposit module.

8. A method performed by an Automated Teller Machine ATM), wherein the ATM includes a computer readable medium having code stored thereon which, when executed by an ATM processor, performs to target ATM operational problems, the method comprising:
    using an ATM receiver configured to receive a workload transmitted via a telecommunications network;
    using an ATM processor configured to execute a script included in the workload, the script including instructions to query one or more characteristics of a network connection that electronically connects the ATM processor to a device external to the ATM processor and internal to the ATM;
    using the ATM processor to make a determination relating to the one or more characteristics of the network connection between the ATM processor and the device external to the ATM processor based on the query; and
    using an ATM transmitter configured to transmit, via the telecommunications network, information corresponding to the determination made by the ATM processor.

9. The method of claim 8, wherein a characteristic of the network connection includes the speed of the network connection.

10. The method of claim 8, wherein the external device is in electronic communication with the ATM processor via a universal serial bus (USB) connection.

11. The method of claim 8, wherein the external device is in electronic communication with the ATM via an application-specific integrated circuit.

12. The method of claim 8, wherein the external device is a cash dispenser.

13. The method of claim 8, wherein the external device is a keypad.

14. A computer readable medium having code stored thereon which, when executed by a processor, is configured to target ATM operational problems, the method comprising:
  using a database configured to store a workload;
  using a transmitter configured to transmit the workload to an automated teller machine (ATM) central processing unit (CPU) via a telecommunications network, the workload including instructions to (1) send an echo request packet to a device external to the ATM CPU and co-located on the ATM, (2) measure at least the round-trip time and any packet loss between the ATM CPU and the external device and (3) transmit information corresponding to the round-trip time and packet loss from the communication between the ATM and the external device; and
  using a receiver configured to receive the information transmitted from the ATM CPU.

\* \* \* \* \*